United States Patent
Bill et al.

(10) Patent No.: US 11,964,671 B2
(45) Date of Patent: Apr. 23, 2024

(54) SYSTEM AND METHOD FOR IMPROVING INTERACTION OF A PLURALITY OF AUTONOMOUS VEHICLES WITH A DRIVING ENVIRONMENT INCLUDING SAID VEHICLES

(71) Applicant: Huawei Technologies Co., Ltd., Shenzhen (CN)

(72) Inventors: Luis Bill, Plano, TX (US); Chengcheng Jia, Plano, TX (US); Lei Yang, Plano, TX (US); Hai Yu, Plano, TX (US); Wei Huang, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 232 days.

(21) Appl. No.: 17/338,359

(22) Filed: Jun. 3, 2021

(65) Prior Publication Data
US 2021/0354726 A1    Nov. 18, 2021

Related U.S. Application Data

(63) Continuation of application No. PCT/US2019/040879, filed on Jul. 8, 2019.

(51) Int. Cl.
*B60W 40/09*  (2012.01)
*B60W 50/06*  (2006.01)
*B60W 60/00*  (2020.01)

(52) U.S. Cl.
CPC ........ *B60W 60/0015* (2020.02); *B60W 40/09* (2013.01); *B60W 50/06* (2013.01);
(Continued)

(58) Field of Classification Search
CPC .. B60W 60/0015; B60W 40/09; B60W 50/06; B60W 2540/221; B60W 2540/223;
(Continued)

(56) References Cited

U.S. PATENT DOCUMENTS 10,254,759 B1    4/2019  Faust et al.
10,769,953 B1 *  9/2020  Salles ................. G05D 1/0287
(Continued)

FOREIGN PATENT DOCUMENTS

CN    104812645 A    7/2015
CN    108216219 A    6/2018
(Continued)

OTHER PUBLICATIONS

Araujo, Jose, Dec. 8, 2017, English Machine Translation_WO2019/ 112501A1 provided by Patent Translate by EPO and Google (Year: 2017).*

(Continued)

*Primary Examiner* — Peter D Nolan
*Assistant Examiner* — Ashley L Readhead, Jr.
(74) *Attorney, Agent, or Firm* — Conley Rose, P.C.

(57) ABSTRACT

The disclosure relates to technology for determining vehicle environment interaction metrics and/or passenger behavioral metrics for autonomous vehicles in a driving environment. A group of one or more autonomous vehicles independently determine a VEI score for a target vehicle within a predefined vicinity of the group of one or more vehicles. A target vehicle may determine a VPB score based on passengers within the target vehicle. VEI scores and/or VPB scores determined for a target vehicle may be used by the target vehicle to reinforce and/or correct driving actions of the target vehicle.

17 Claims, 10 Drawing Sheets

(52) U.S. Cl.
CPC . *B60W 2540/221* (2020.02); *B60W 2540/223* (2020.02); *B60W 2554/4041* (2020.02); *B60W 2554/80* (2020.02); *B60W 2556/65* (2020.02)

(58) Field of Classification Search
CPC ..... B60W 2554/4041; B60W 2554/80; B60W 2556/65; B60W 60/00; B60W 2050/0088; B60W 2540/22; B60W 2554/404; B60W 2554/4046; B60W 2756/10; B60W 40/08; B60W 40/04
See application file for complete search history.

(56) References Cited

U.S. PATENT DOCUMENTS

| | | | |
|---|---|---|---|
| 2012/0072243 A1* | 3/2012 | Collins | G06Q 10/10 |
| | | | 705/4 |
| 2014/0037504 A1 | 2/2014 | Masters | |
| 2014/0088855 A1 | 3/2014 | Ferguson | |
| 2015/0178578 A1* | 6/2015 | Hampiholi | G08G 1/166 |
| | | | 348/149 |
| 2017/0122911 A1 | 5/2017 | McCarron | |
| 2018/0061237 A1 | 3/2018 | Erickson et al. | |
| 2018/0126381 A1 | 5/2018 | Huff | |
| 2018/0173224 A1 | 6/2018 | Kim | |
| 2018/0173240 A1 | 6/2018 | Fang et al. | |
| 2020/0023839 A1* | 1/2020 | Yan | H04W 4/46 |
| 2020/0283003 A1* | 9/2020 | Raichelgauz | A61B 5/18 |
| 2020/0300647 A1* | 9/2020 | Yurdakul | B60T 7/18 |
| 2020/0394915 A1* | 12/2020 | Salles | B60W 10/10 |
| 2021/0223391 A1* | 7/2021 | Drysch | G08G 1/0129 |
| 2021/0245775 A1* | 8/2021 | Subramanian | G06V 20/597 |
| 2022/0363267 A1* | 11/2022 | Kristinsson | B60W 40/107 |
| 2022/0375348 A1* | 11/2022 | Ucar | G08G 1/0145 |

FOREIGN PATENT DOCUMENTS

| | | | | |
|---|---|---|---|---|
| CN | 108475057 A | | 8/2018 | |
| DE | 1020122180521 A | | 4/2014 | |
| WO | 2018094384 A1 | | 5/2018 | |
| WO | WO-2018094384 A1 | * | 5/2018 | ............... A61B 5/01 |
| WO | 2019112501 A1 | | 6/2019 | |
| WO | WO-2019112501 A1 | * | 6/2019 | ............ A61B 5/163 |

OTHER PUBLICATIONS

Baik, Edward H, Nov. 21, 2017, English Machine Translation_ WO2018/094384A1 provided by Patent Translate by EPO and Google (Year: 2017).*

Riaz, F., et al., "Augmenting Autonomous Vehicular Communication Using the Appreciation Emotion: A Mamdani Fuzzy Inference System Model," 2015 13th International Conference on Frontiers of Information Technology, 2015, 7 pages.

Kraus, S., et al., "Cognition and Emotion in Autonomous Cars," Doi: 10.1109/IVS.2009.5164351 · Source: IEEE Xplore, https://www.researchgate.net/publication/224562491, Jul. 2009, 7 pages.

* cited by examiner

SYSTEM AND METHOD FOR IMPROVING INTERACTION OF A PLURALITY OF AUTONOMOUS VEHICLES WITH A DRIVING ENVIRONMENT INCLUDING SAID VEHICLES

CROSS-REFERENCE TO RELATED APPLICATIONS

This application is a continuation of International Application No. PCT/US2019/040879 filed on Jul. 8, 2019, by Futurewei Technologies, Inc., and titled "System And Method For Improving Interaction Of A Plurality Of Autonomous Vehicles With A Driving Environment Including Said Vehicles," which is hereby incorporated by reference.

TECHNICAL FIELD

The disclosure generally relates to vehicles, and in particular to a system in an autonomous vehicle that allows the autonomous vehicle to recognize and react to the behavior of passengers and nearby vehicles.

BACKGROUND

Self-driving vehicles, in which sensors and software replace human drivers in controlling, navigating, and driving the vehicle, will in the near future radically transform our transportation system. Scientists have largely been able to quantify and solve the problems of obstacle detection and avoidance in self-driving, or autonomous, vehicles. However, developing computerized control systems that understand the environment in which a vehicle travels, as humans do, is still a problem that eludes solution. In particular, autonomous vehicles not only need to understand when the environment is changing, but also why the environment is changing.

Emotional behaviors are an important aspect that influence the driving style of humans, and an important aspect when trying to fully understand the environment. The emotional behaviors of the one or more vehicle passengers, e.g., aggressive, angry, stressed, fearful, passive, relaxed, may often have an effect on how a vehicle is driven and how other drivers perceive that vehicle. Therefore, implementing a system in an autonomous vehicle which detects and reacts to the behavior of surrounding vehicles can help the vehicle better understand its environment, and understand how its driving behavior affects the environment.

SUMMARY

According to one aspect of the present disclosure, there is provided a system for improving interaction of a plurality of autonomous vehicles with a driving environment including the autonomous vehicles, the system comprising: a first autonomous vehicle of the plurality of autonomous vehicles; one or more sensors on the first autonomous vehicle, the one or more sensors configured to record environment interaction metrics of a second autonomous vehicle relating to how the second autonomous vehicle interacts with the driving environment, the first autonomous vehicle configured to transmit an indicator of the environment interaction metrics to the second autonomous vehicle for use by the second autonomous vehicle in reinforcing and/or correcting how the second vehicle drives.

Optionally, in any of the preceding aspects, the environment interaction metrics are based on how courteously and/or safely the second autonomous vehicle is interacting with the driving environment.

Optionally, in any of the preceding aspects, the environment interaction metrics comprise one or more of:
Identification of the second autonomous vehicle, including for example a year, make and model of the second autonomous vehicle and registration information for the second autonomous vehicle;
current driving speed of the second autonomous vehicle;
location of the second autonomous vehicle;
actions of the second autonomous vehicle, including how often the second autonomous vehicle changes lanes;
number of passengers of the second autonomous vehicle;
power of the second autonomous vehicle;
driving and/or accident history of the second autonomous vehicle;
mileage of the second autonomous vehicle; and
the type of sensors used in the second autonomous vehicle.

Optionally, in any of the preceding aspects, the environment interaction metrics are stored in a data tube and processed by an algorithm to obtain the indicator.

Optionally, in any of the preceding aspects, the indictor comprises a first indicator, the first autonomous vehicle further generating a second indicator based on behavioral characteristics of one or more passengers in the first autonomous vehicle, the first autonomous vehicle using the second indicator to reinforce and/or correct how the first autonomous vehicle drives.

Optionally, in any of the preceding aspects, the behavioral characteristics are captured by a second set of sensors in an interior of the first autonomous vehicle.

Optionally, in any of the preceding aspects, the second set of sensors capture at least one of facial expression, body pose, actions, hand gestures and utterances of the one or more passengers in the first autonomous vehicle.

Optionally, in any of the preceding aspects, the first and second autonomous vehicles are within a predefined distance of each other.

Optionally, in any of the preceding aspects, the predefined distance is varied by the first autonomous vehicle based on the driving environment.

According to another aspect of the present disclosure, there is provided a system for improving interaction of a plurality of autonomous vehicles with a driving environment including the autonomous vehicles, the system comprising: a first autonomous vehicle of the plurality of autonomous vehicles, the first autonomous vehicle comprising: a first group of one or more sensors configured to capture a first set of data relating to characteristics of a second autonomous vehicle driving within the driving environment; a second group of one or more sensors configured to capture a second set of data relating to behaviors of one or more passengers within the first autonomous vehicle; and a computer executing at least one of first and second algorithms; the first of the first and second algorithms instructing the computer to: receive the first set of data captured from the first group of one or more sensors, calculate a VEI score based on the first set of captured data, the VEI score relating to a manner in which the second autonomous vehicle is driving, and communicate the VEI score from the first autonomous vehicle to the second autonomous vehicle for the second autonomous vehicle to reinforce and/or correct the manner in which the second autonomous vehicle drives; and the second of the first and second algorithms instructing the computer to:

receive the second set of data captured from the second group of one or more sensors, calculate a VPB score based on the second set of captured data, the VPB score relating to perceived emotions of the one or more passengers in the first autonomous vehicle, and use the calculated VPB score to reinforce and/or correct the manner in which the first autonomous vehicle drives.

Optionally, in any of the preceding aspects, the computer further determines a VEI radius around the first autonomous vehicle, the second autonomous vehicle being within the VEI radius of the first autonomous vehicle.

Optionally, in any of the preceding aspects, a size of the VEI radius varies based on the driving environment and/or on the vehicle sensors being used, and/or on vehicle manufacturer settings, and/or on the driver/authorized passenger(s) settings.

Optionally, in any of the preceding aspects, the VEI score relates to how courteously and/or safely the second autonomous vehicle is interacting with the driving environment, as measured by the first autonomous vehicle.

Optionally, in any of the preceding aspects, the VPB score relates to how courteously and/or safely the first autonomous vehicle is interacting with the driving environment, as measured by the perceived emotions of the one or more passengers.

Optionally, in any of the preceding aspects, the technology further comprises a cloud service for storing information relating to the second autonomous vehicle, the computer further receiving the information from the cloud service for use in determining the VEI score.

Optionally, in any of the preceding aspects, the technology further comprises a third vehicle receiving information from the second vehicle, the information based on at least one of the VEI score and the VPB score, and the information used by the third vehicle to reinforce and/or correct the manner in which the third autonomous vehicle drives.

According to another aspect of the present disclosure, there is provided a method of improving interaction of a plurality of autonomous vehicles with a driving environment including the autonomous vehicles, the method comprising: measuring, by each vehicle of a group of one or more subject vehicles of the plurality of autonomous vehicles, a set of attributes relating to the manner in which a target vehicle of the plurality of autonomous vehicles is driving; storing the measured set of attributes; calculating a VEI score for each set of attributes measured by each vehicle of the group of one or more subject vehicles, the one or more VEI scores representing how well the target vehicle is interacting with the group of one or more vehicles and the driving environment; communicating the one or more VEI scores to the target vehicle for the target vehicle to affirm and/or adjust driving actions of the target vehicle based on the one or more received VEI scores.

Optionally, in any of the preceding aspects, said step of storing the measured attributes comprises the step of storing the measured attributes in a VEI tube.

Optionally, in any of the preceding aspects, said step of calculating the VEI score comprises the step of calculating the VEI score using, for example, a neural network which takes the data from the VEI tube as inputs.

According to another aspect of the present disclosure, there is provided a method of improving interaction of a plurality of autonomous vehicles with a driving environment including the autonomous vehicles, the method comprising: measuring a set of attributes indicative of an emotional state of one or more passengers in an autonomous vehicle of the plurality of autonomous vehicles; storing the measured set of attributes; calculating a VPB score for the set of attributes measured, the VPB scores representing a measure of an emotional state of at least one of the one or more passengers; adjusting driving actions of the vehicle based on the one or more determined VPB scores.

Optionally, in any of the preceding aspects, said step of storing the measured attributes comprises the step of storing the measured attributes in a VPB tube.

Optionally, in any of the preceding aspects, said step of calculating the VPB score comprises the step of calculating the VPB score using a, for example, neural network which takes the data from the VPB tube as inputs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The present disclosure will now be described with reference to the figures, which in general relate to a system and method determining behavioral metrics for how autonomous vehicles interact with their environment. In accordance with a first aspect of the present technology, a group of one or more autonomous vehicles independently determine an indicator, referred to herein as a "vehicle environment interaction score," or simply "VEI score," for a target vehicle within a predefined vicinity of the group of one or more vehicles. In embodiments, a VEI score refers to objectively measurable or determined attributes and characteristics of how a target vehicle is driving, for example how courteously and/or safely the target vehicle is interacting with other vehicles and its driving environment. VEI scores determined for a target vehicle by other vehicles around it may be communicated to the target vehicle to reinforce and/or correct driving actions of the target vehicle.

In accordance with a second aspect of the present technology, an autonomous vehicle may also determine an indicator, referred to herein as "vehicle passenger behavior score," or simply "VPB score," for passengers within the subject vehicle. In embodiments, "vehicle passenger behavior" refers to the objectively observable behavioral characteristics of passengers within an autonomous vehicle, based for example on their perceptions of how courteously and/or safely a given vehicle is interacting with other vehicles and its driving environment. Using a VEI score and/or a VPB score, the present technology makes it easier for vehicles to learn from each other and better understand how to interact with their driving environment.

Figure 1:
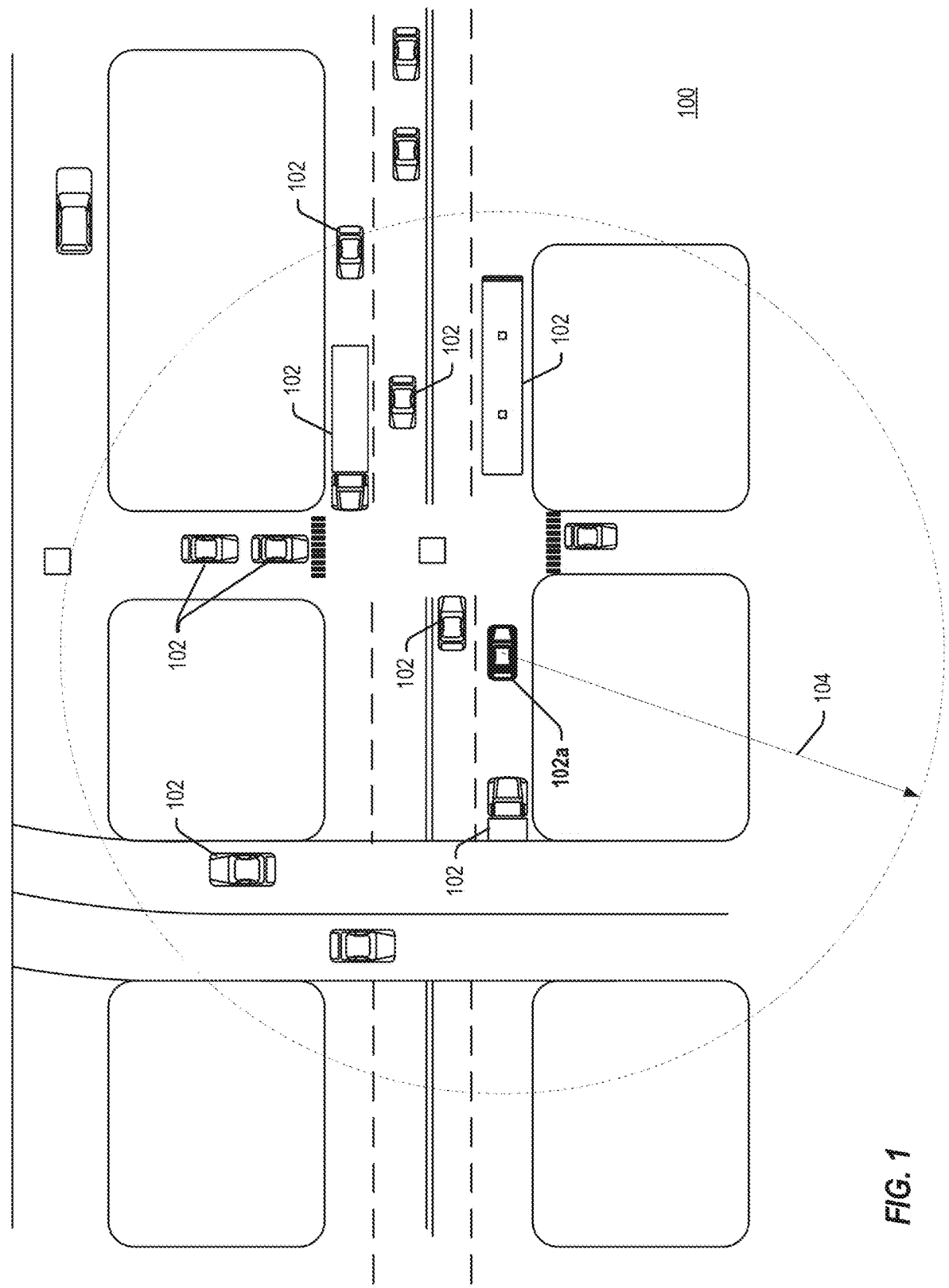
FIG. 1 is a schematic top view of a driving environment in which embodiments of the present technology may be implemented.

FIG. 1 is a top schematic view of a driving environment 100. The environment 100 shown is by way of example, and the present technology may be employed in any environment in which autonomous vehicles drive or may be driven. FIG. 1 shows a number of autonomous vehicles 102, which may include autonomous automobiles, trucks, buses, vans, and possibly other motorized vehicles. The respective positions, types and numbers of autonomous vehicles shown is by way of example only, and may vary in further embodiments. While the present technology is described below with reference to land-based autonomous vehicles, the principles of the present technology may also be applied to water-based autonomous vehicles such as boats and ships, or air-based autonomous vehicles such as planes, helicopters and flying cars.

FIG. 1 shows a highlighted autonomous vehicle 102a, referred to herein as the subject vehicle. As explained below, the subject vehicle 102a determines certain interaction and/or behavioral metrics about vehicles within a predefined radius, and passengers within the subject vehicle, and then shares those metrics with other autonomous vehicles 102 within the predefined radius. However, it is understood that each of the vehicles within the driving environment 100 may determine these interaction and/or behavioral metrics, and share these metrics with each other autonomous vehicle 102 within the predefined radius, as explained below.

The size of the predefined radius, referred to herein as the vehicle environment interaction radius, or VEI radius, 104, may vary depending on a number of factors, and can be adjusted by the self-driving vehicle (in real-time), or by the authorized passengers, or can be a preset setting provided by the vehicle manufacturer. The VEI radius can also be defined based on a number of factors, including but not limited to, vehicle real-time location, the time of day (whether it is rush hour or not), weather conditions (wet roads, heavy rain, etc.), whether it is daytime or nighttime, or whether other vehicles around are driving fast or slow, etc. All these factors may play a role on the calculation of the specific size of the VEI radius.

FIG. 1 shows a number of autonomous vehicles 102 within the VEI radius 104 of the subject vehicle 102a. The subject vehicle 102a may determine which other autonomous vehicles are within its VEI radius 104. For example, the subject vehicle 102a may contain sensors, such as outside-facing image sensors and radar sensors that can be used for object detection. The outward-facing image sensors may include, but are not limited to, color cameras, NIR cameras, time-of-flight cameras, or any other camera or imaging sensor available and suitable for the system. The system may also utilize various other sensors, such as Lidar, depth sensors, radars, sound sensors, ultrasonic sensors, among other sensors that can be suitable for object detection. The system may also make use of GPS in order to detect if other vehicles are located inside the VEI radius.

The VEI radius 104 moves with the subject vehicle 102a. As such, other autonomous vehicles 102 may move inside and out of the VEI radius 104 of the subject vehicle 102a. Although described merely with respect to the subject vehicle 102a, each of the autonomous vehicles have its own VEI radius, within which each other autonomous vehicle tracks other vehicles.

Figure 2:
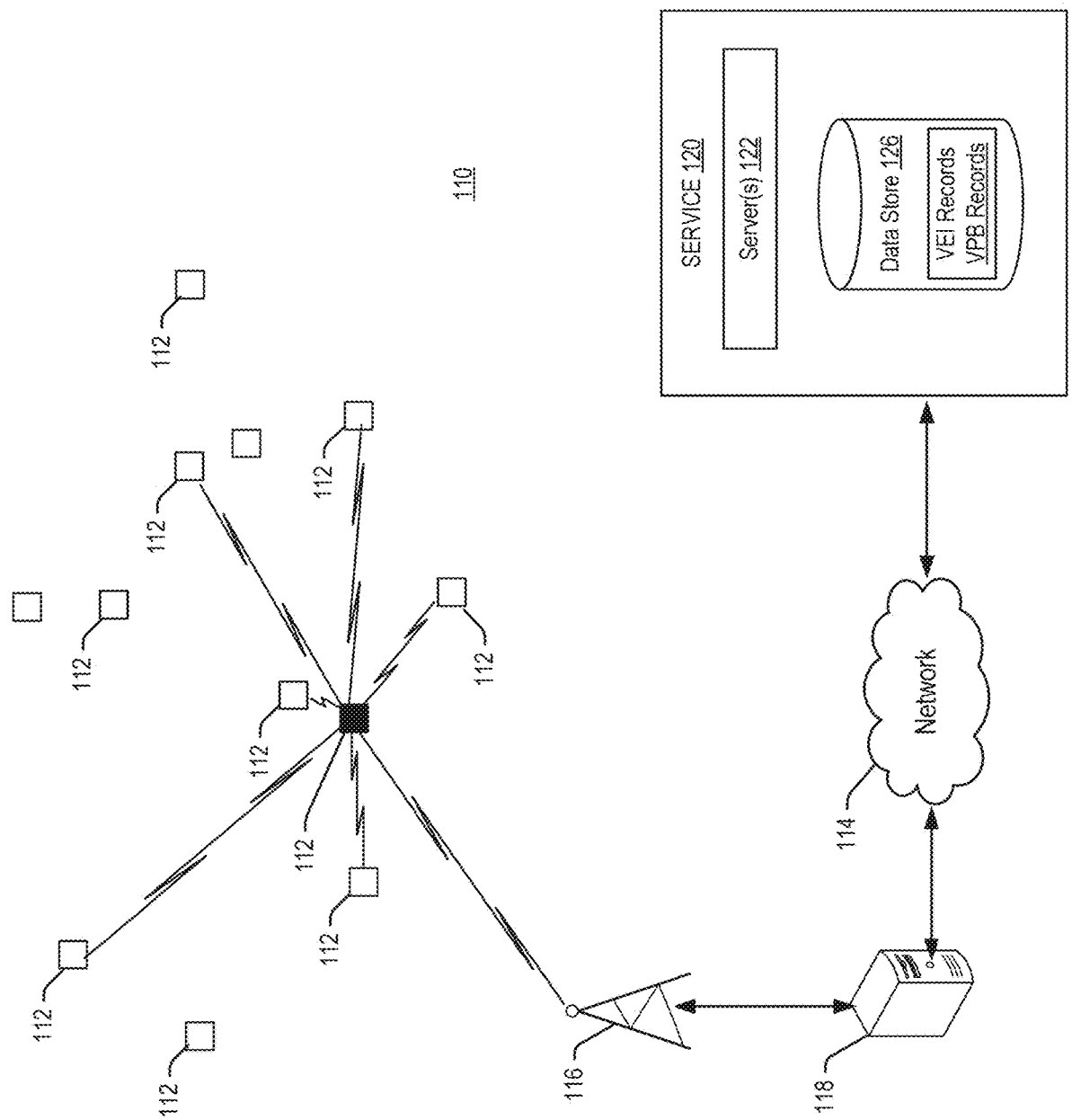
FIG. 2 is a schematic view of a network environment in which embodiments of the present technology may be implanted.

FIG. 2 is a schematic representation of a communications network 110 enabling the subject vehicle 102a (and other autonomous vehicles 102) to determine the environment interaction and behavioral metrics, and to share those metrics with other autonomous vehicles. Each of the vehicles 102 may include an on-board computer 112, capable of determining environment interaction and behavioral metrics and sharing those metrics with other autonomous vehicles within the VEI radius 104. On-board computer 112 of an autonomous vehicle 102 may for example be a computing system built into the autonomous vehicle 102, and may be responsible for the autonomous driving functions of the vehicle 102. In further embodiments, the on-board computer 112 may be in communication with another computing system in vehicle 102 that is responsible for the autonomous driving functions of the vehicle 102. A sample implementation of the on-board computer is set forth below with respect to FIG. 13.

In embodiments, the on-board computer 112 in each autonomous vehicle 102 may be configured for peer-to-peer communications with the on-board computer 112 of each other vehicle 102 within the VEI radius 104. Additionally or alternatively, the on-board computer 112 of each autonomous vehicle 102 may be configured for wireless communication with a network 114 via wireless protocols and/or via a mobile telephone network. The mobile telephone network may include base stations 116 (one of which is shown) for transferring data and software between the autonomous vehicles 102 and a mobile network backbone 118. Backbone 118 may in turn have a network connection to network 114.

FIG. 2 further shows a cloud service 120. As explained below, the on-board computer 112 of the subject vehicle 102 may use historical VEI and/or VPB scores, for itself and other vehicles, as well as other historical information, when calculating current VEI and/or VPB scores. This historical VEI score, VPB score and other data may come from a cloud service 120. Cloud service 120 may include one or more servers 122, including a webserver, and a data store 126 for storing historical VEI scores, VPB scores and other data.

Figure 3:
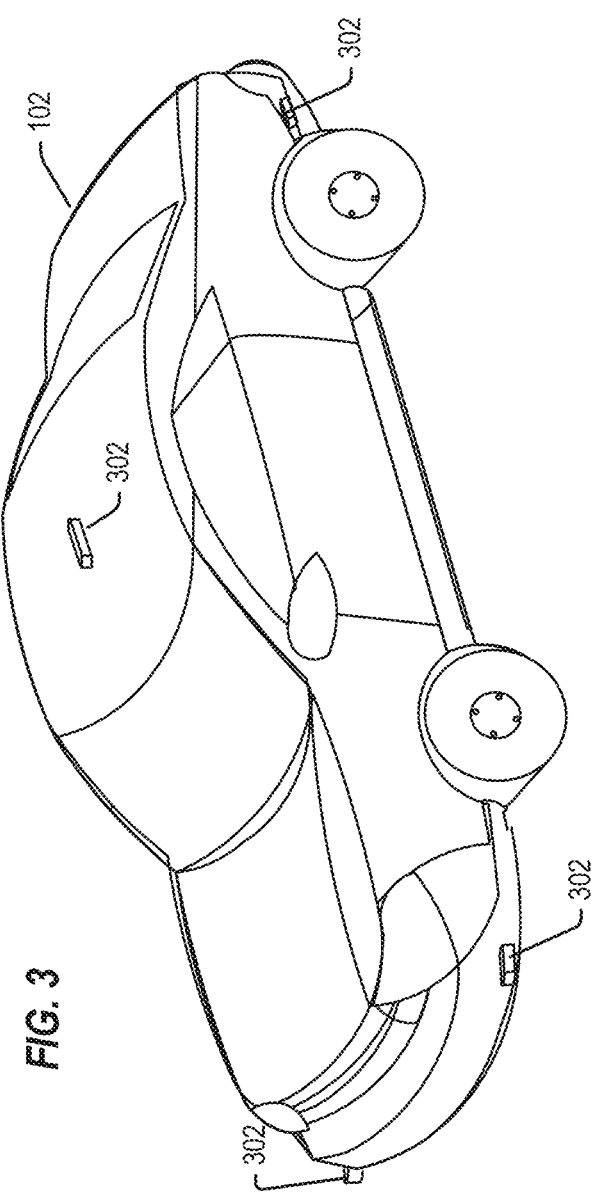
FIG. 3 is a perspective view of an exterior of an autonomous vehicle including a number of sensors for sensing the vehicle's interaction with this driving environment.

FIG. 3 shows an example of an autonomous vehicle 102, such as the subject vehicle 102a, including various sensors 302 for gathering data about other autonomous vehicles for use in determining the VEI scores for those vehicles. As noted above, these sensors 302 may include but are not limited to one or more color, NIR, time-of-flight or other cameras, and/or other sensors, such as Lidar, depth, radars, sound, ultrasonic, or other sensors suitable for object detection. The particular sensors 302 shown are by way of example only, and the autonomous vehicle 102 may include other sensors in other locations in further embodiments.

Figure 4:
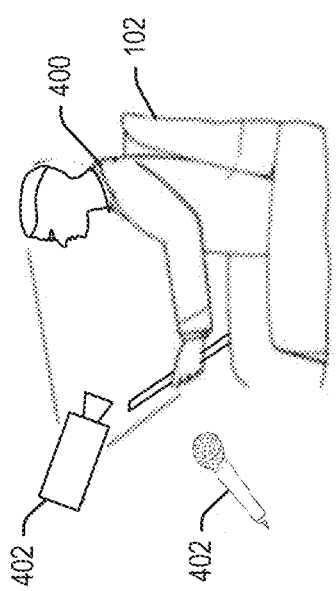
FIG. 4 is a side view of an interior of an autonomous vehicle including a number of sensors for sensing physical and/or auditory attributes of passengers within the vehicle.

FIG. 4 shows an example of an interior of an autonomous vehicle 102, such as the subject vehicle 102a, including various sensors 402 for gathering data about passengers within the autonomous vehicle for use in determining the VPB score. These sensors 402 may include but are not limited to one or more color, NIR, time-of-flight or other cameras, and/or other sensors, such as depth, sound, or other sensors suitable for passenger detection. The particular sensors 402 shown are by way of example only, and the interior of the autonomous vehicle 102 may include other sensors in other locations in further embodiments.

Figure 5:
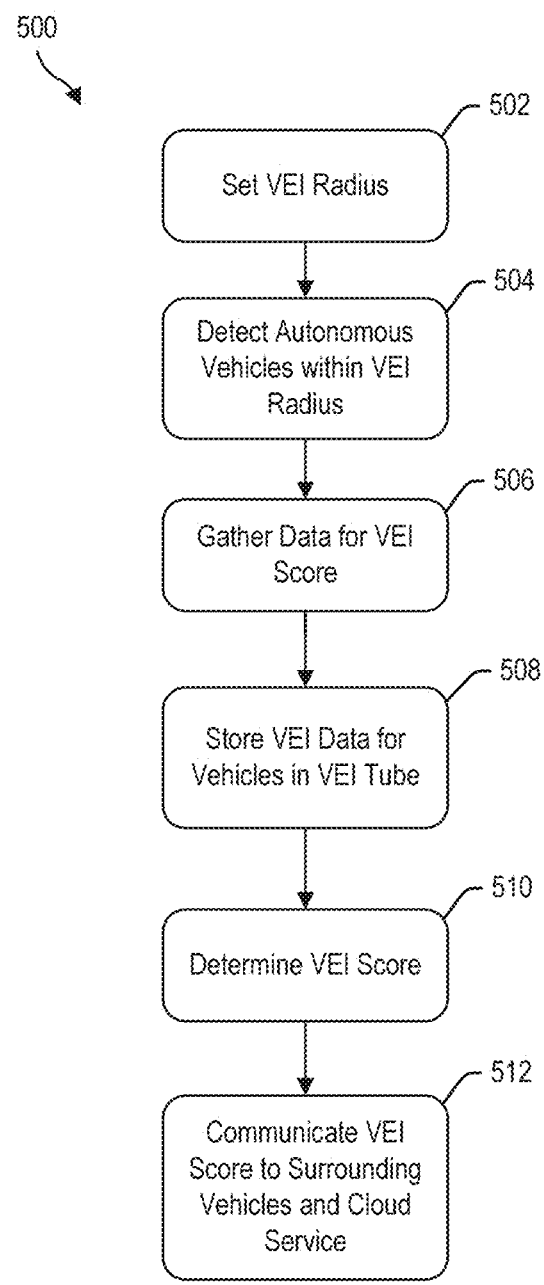
FIG. 5 is a flowchart illustrating steps in the determination of a vehicle environment interaction score according to embodiments of the present technology.

As noted, the present technology uses a VEI score, developed by the subject vehicle 102a for each other autonomous vehicle 102 in the VEI radius 104. For example, a subject vehicle 102a may gather data and determine a VEI score for a target vehicle within the VEI radius. The target vehicle may then receive feedback based on the VEI score determined by the subject vehicle for the target vehicle. The target vehicle may then use that feedback to better understand how to interact with and navigate the driving environment 100 shown in FIG. 1. In embodiments, vehicle environment interaction metrics used to determine the VEI score are determined from objectively observable characteristics of the target vehicle. These metrics may for example relates to how courteously and/or safely the target vehicle is interacting with other vehicles and its driving environment. FIG. 5 is a flowchart 500 showing an embodiment by which the on-board computer 112 of the subject vehicle 102a develops the VEI score for the autonomous vehicles 102 within its VEI radius 104.

In step 502, the VEI radius 104 is set, and in step 504, autonomous vehicles within the VEI radius 104 are detected as described above. In step 506, the on-board computer 112 gathers data about the other autonomous vehicles in the VEI radius 104. The data gathered by the subject vehicle regarding a target vehicle may include for example some or all of the following:
- target vehicle identification, including for example a year, make and model of the vehicle and registration information for the vehicle;
- target vehicle current driving speed;
- target vehicle location;
- target vehicle actions (such as whether the target vehicle changes lanes frequently);
- target vehicle number of passengers;
- target vehicle power;
- training data used by target vehicle manufacturers to train the vehicle's autonomous driving capabilities;
- target vehicle VEI score history;
- target vehicle driving and/or accident history;
- target vehicle mileage;
- the type of sensors used in the target vehicle;
- whether, when in manual mode, human driver prefers driving fast (e.g., if the vehicle is a sports car);
- the purpose of target vehicle, which can be categories as special purposes vehicles (ambulance, fire truck, police car, etc.) and common purpose vehicles (such as commuter cars);
- the type of vehicle the target vehicle is, which can be categorized as weak (such as motorcycles) all the way to strong (such as sports cars and trucks).

These target vehicle properties are by way of example only, and other properties may be gathered by the subject vehicle in addition to or instead of one or more of those properties set forth above. The above-described target vehicle data may be sensed by sensors in the subject vehicle. Alternatively or additionally, the target vehicle data may be transmitted from the target vehicle to the subject vehicle upon establishing a peer-to-peer (or other) network connection. Alternatively or additionally, target vehicle data may be obtained from the cloud service 120, upon receiving an identification of the target vehicle.

Figure 6:
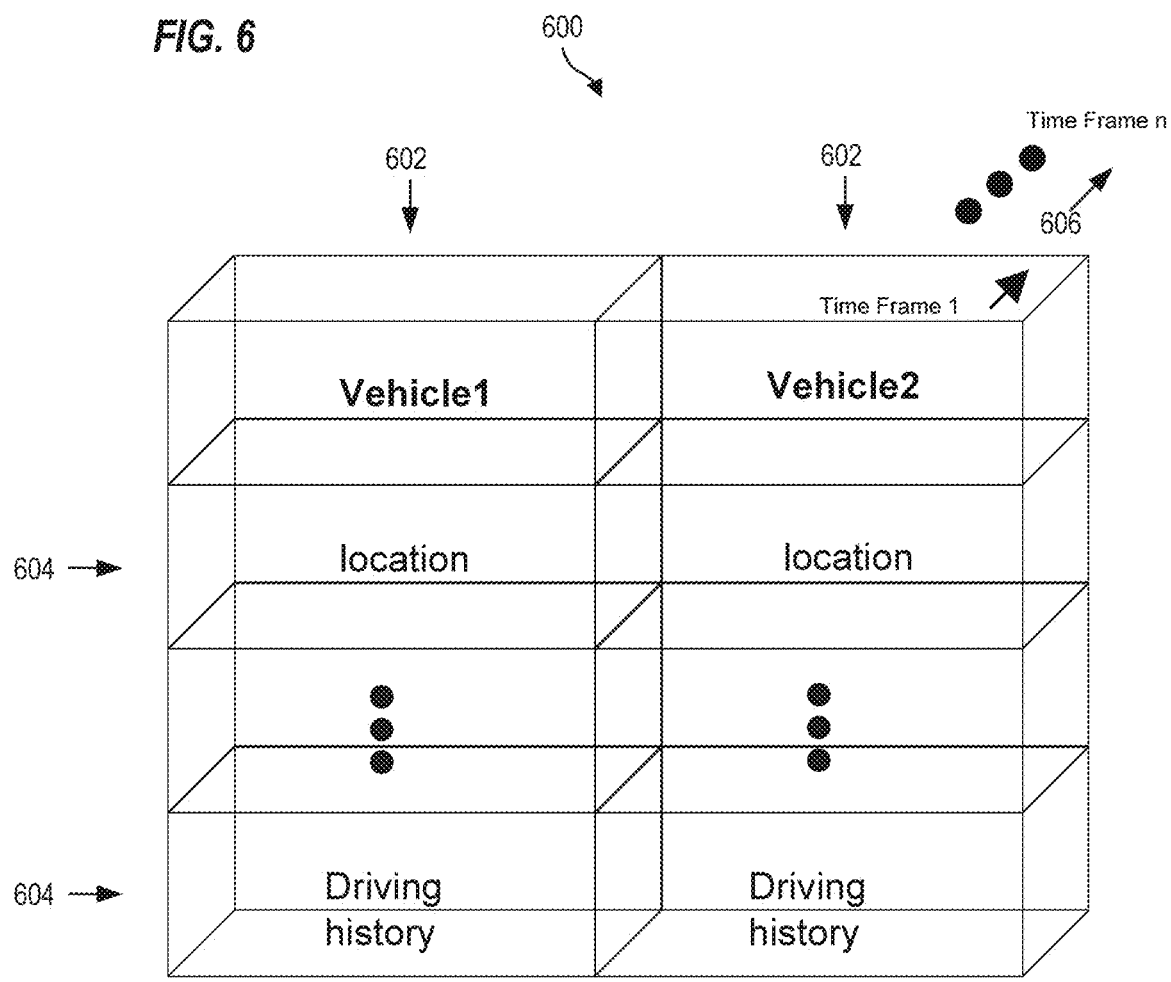
FIG. 6 is an illustration of a vehicle environment interaction data tube according to embodiments of the present technology.

Once the VEI data has been gathered, the information is stored in a data structure in step 508 referred to herein as a VEI data tube, or simply, VEI tube, an example of which is shown in FIG. 6. In the VEI tube 600, each column 602 can be associated with a vehicle 102. Each row 604 relates to a different parameter or characteristic gathered in step 506 described above. The depth 606 of the VEI tube 600 indicates frames at each time step at which data is gathered. Data may for example be gathered at the frame rate of at least one of the external and internal sensors shown in FIGS. 3 and 4. Having columns, rows and depth, a VEI tube 600 may be a 3D volume data structure that stores information about each vehicle within the VEI radius over time.

The VEI tube 600 allows the system to organize the attributes and characteristics of each vehicle 102 within the VEI radius 104. Making it easier to organize the data allows the system to better understand what each individual vehicle is doing. The VEI tube 600 also allows the system to process information about the surrounding vehicles in parallel, as the VEI tube is inherently a concurrent data structure.

Furthermore, the organization of the data in the VEI tube 600 can also be used to understand if there is any interaction between the autonomous vehicles 102 in the VEI radius 104. For instance, if there is car chase (i.e., between a police car and another vehicle), it is likely that both vehicles will be driving near each other, and at similarly high speed. This information that two (or more) vehicles are interacting would be readily apparent from the data stored in the VEI tube 600. This correlative data may be used to indicate to the subject vehicle to stay away from the interacting vehicles.

Once the gathered data is stored in a VEI tube data structure 600, the on-board computer 112 can execute a classifier algorithm using the VEI tube data to determine the VEI score in step 510. In one embodiment, the classifier algorithm may be implemented in a neural network, including for example a convolutional neural network, a recurrent neural network or a combination of the two. Such a neural network can be trained using test data in a VEI tube, as well as live data from a VEI tube over time. In this way, the neural network can learn the patterns over time that equate to a specific VEI score (e.g., aggressive driving and/or fearful driving can label a vehicle with a low VEI score or level).

It is understood that algorithms other than, or in addition to, those using neural networks may also be used to calculate a VEI score. One such additional algorithm is a deep reinforcement learning algorithm. Deep reinforcement learning algorithms allow vehicles to use the VEI score (and other observations about the environment) to continuously learn from its driving performance. By using reinforcement learning, the subject and/or target vehicles can make observations about how the environment is reacting to the actions taken by the target vehicle. And based on the actions taken, the target vehicle will receive a reward, which can be a feedback to the system as input. In this case, the reward is a higher VEI score. The system's goal is to learn to improve its driving performance so that the VEI score can be maximized. The target vehicle can use, but is not limited to, neural networks as part of the policies that allow the vehicle to take specific actions in order to maximize its VEI score.

Figure 7:
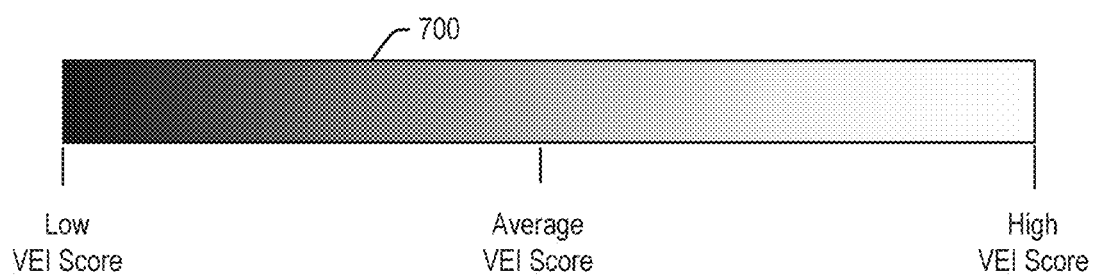
FIG. 7 illustrates a scale of a vehicle environment interaction scores from low to high according to embodiments of the present technology.

VEI levels can be used in order to interpret how well a vehicle is following driving rules, and also how well a vehicle is interacting with its environment. FIG. 7 demonstrates an example of a range of VEI scores 700, varying from low to high. A low VEI score determined by the subject vehicle 102a for the target vehicle may mean that the target vehicle is driving poorly or in a high risk manner, and that the subject vehicle 102 should use higher care when encountering the target vehicle as compared to encounters with other vehicles with higher VEI scores. Conversely, a high VEI score may mean that the target vehicle is driving well and interacting well with the driving environment.

In step 512, the VEI score calculated by the on-board computer 112 of the subject vehicle 102a for the target vehicle may be communicated from the subject vehicle to the target vehicle and other autonomous vehicles 102 in the VEI radius 104. The calculated VEI score may also be uploaded to the cloud service 120.

The target vehicle can use the VEI score calculated for it by the subject vehicle (and other autonomous vehicles) to reinforce its driving and interaction with the driving environment, and/or to improve its driving and interaction with the driving environment. In particular, each autonomous vehicle may drive and interact with its driving environment according to a predefined policy. The policy, referred to herein as an environmental interaction policy, may be trained and updated in real time by an algorithm such as for example implemented in a neural network. This neural network may for example be a convolutional neural network or a recurrent neural network.

Figure 8:
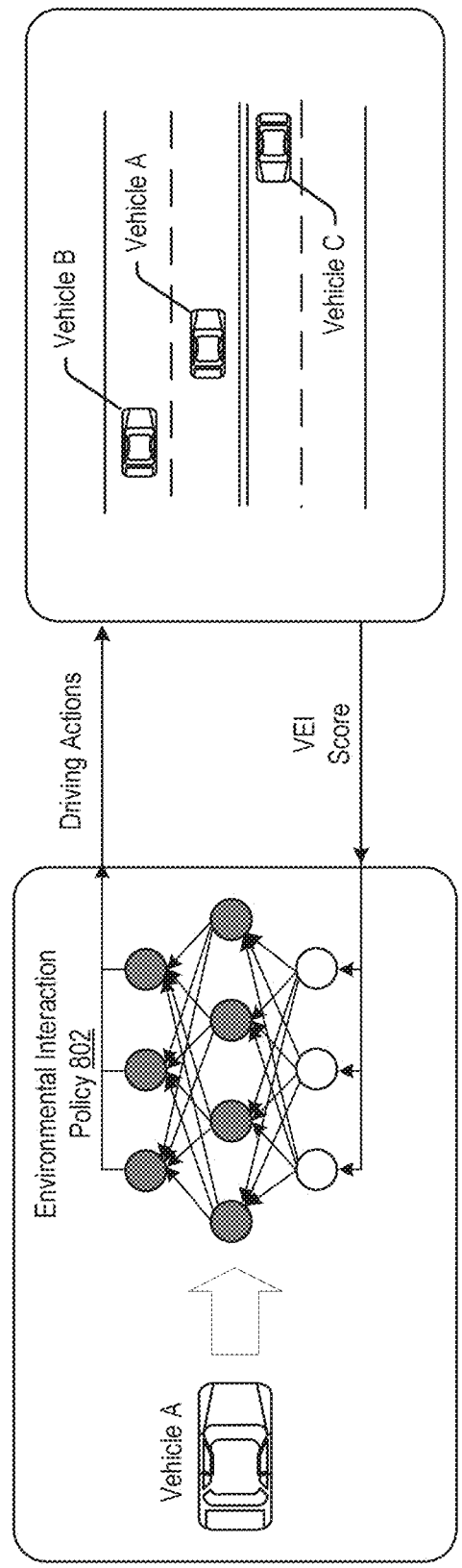
FIG. 8 is a schematic representation of a feedback loop in which a vehicle environment interaction scores for a vehicle may be fed back into an environmental interaction policy to reinforce and/or improve the driving of the vehicle according to embodiments of the present technology.

FIG. 8 illustrates schematically a neural network environmental interaction policy 802 for a vehicle A learning in a closed loop feedback system from VEI scores received from other vehicles in its driving environment 804, such as vehicles B and C. The driving actions (among other possible properties) of vehicle A result in the other vehicles generating VEI scores for vehicle A. Those scores are received by the vehicle A, and fed back into the environmental interaction policy 802 for vehicle A so that vehicle A can improve its driving actions and better interact with the driving environment 804.

VEI scores are generated through vehicle-to-vehicle interaction as described above. In accordance with a further aspect of the present technology, vehicle passenger behavioral scores, or VPB scores, may also be generated through vehicle-to-passenger interaction. In general, VPB scores represent a measure of passengers' emotional state in a vehicle 102. The VPB scores may be fed back into the environmental interaction policy as explained below in order for the vehicle 102 to understand whether it should change its driving style and if so, how. The VPB scores may also be communicated to other vehicles as explained below.

Figure 9:
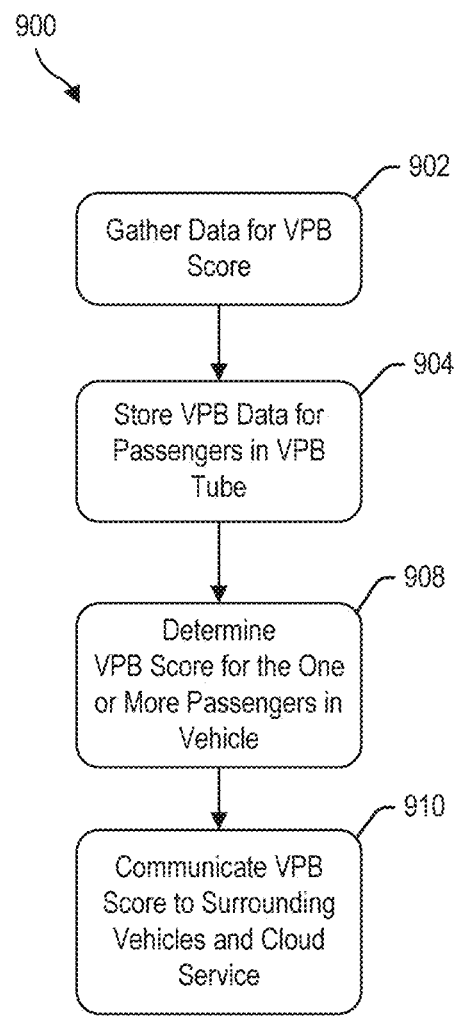
FIG. 9 is a flowchart illustrating steps in the determination of a vehicle passenger behavior score according to embodiments of the present technology.

FIG. 9 is a flowchart showing the overall operation of the present technology to generate a VPB score. In general, the VPB score is based on the observation that human emotional states are communicated through a variety of objectively observed nonverbal and verbal behaviors. The range of linguistic and nonlinguistic behaviors that transmit information is exceedingly large. A passenger's emotional state, whether excited or calm, happy or sad, etc., may be indicated by a number of easily observed physical traits. For example, a person's emotional state—happy, sad, angry, surprised, confused, etc. may each be discerned from different facial expressions. Emotional state can also be implied from body pose (e.g., slumped, sitting up, sitting forward) or body gesture (e.g., waving arms, shrugging shoulders, hand(s) over face), as well as the urgency with which these gestures are performed. Emotional state can also be discerned from a wide variety of auditory cues. Such auditory cues may for example include spoken words, singing, expressions and/or other utterances, as well as the pitch, tenor and/or volume of the utterances.

In step 902, the on-board computer 112 gathers data about the passengers within a subject vehicle. As noted above with respect to FIG. 4, the interior of a vehicle may contain a variety of sensors, including for example any of various cameras and microphones. These sensors are set up to detect a variety of physical and/or auditory attributes from which the emotional state of the one or more passengers can be inferred. For example, one or more color, depth or other cameras may be used to detect the positions and expressions of the one or more passengers' facial features, as well as head pose and gaze direction. The internal sensors may also be used to detect body pose and movements, such as hand and other gestures and interaction between the passengers (e.g., holding hands because they are scared). The internal sensors may be used to detect a variety of other physical data. As is known, imaging of a person can be used to develop skeletal pose data representative of body pose at a given instant in time, and/or physical gestures performed over a period of time. The sensors may also comprise one or more microphones used to detect speech, singing and other utterances, as well as the pitch, tenor and/or volume of the utterances.

In addition to providing emotional state information, the physical and/or auditory data captured by the sensors may also be used to identify one or more passengers within a vehicle. Once a passenger has been identified, the on-board computer may further gather historical data about that passenger in step 902 from the cloud service 120. This historical data may include past physical and auditory characteristics captured for the identified passenger, as well as historical VPB scores for the identified passenger.

Figure 10:
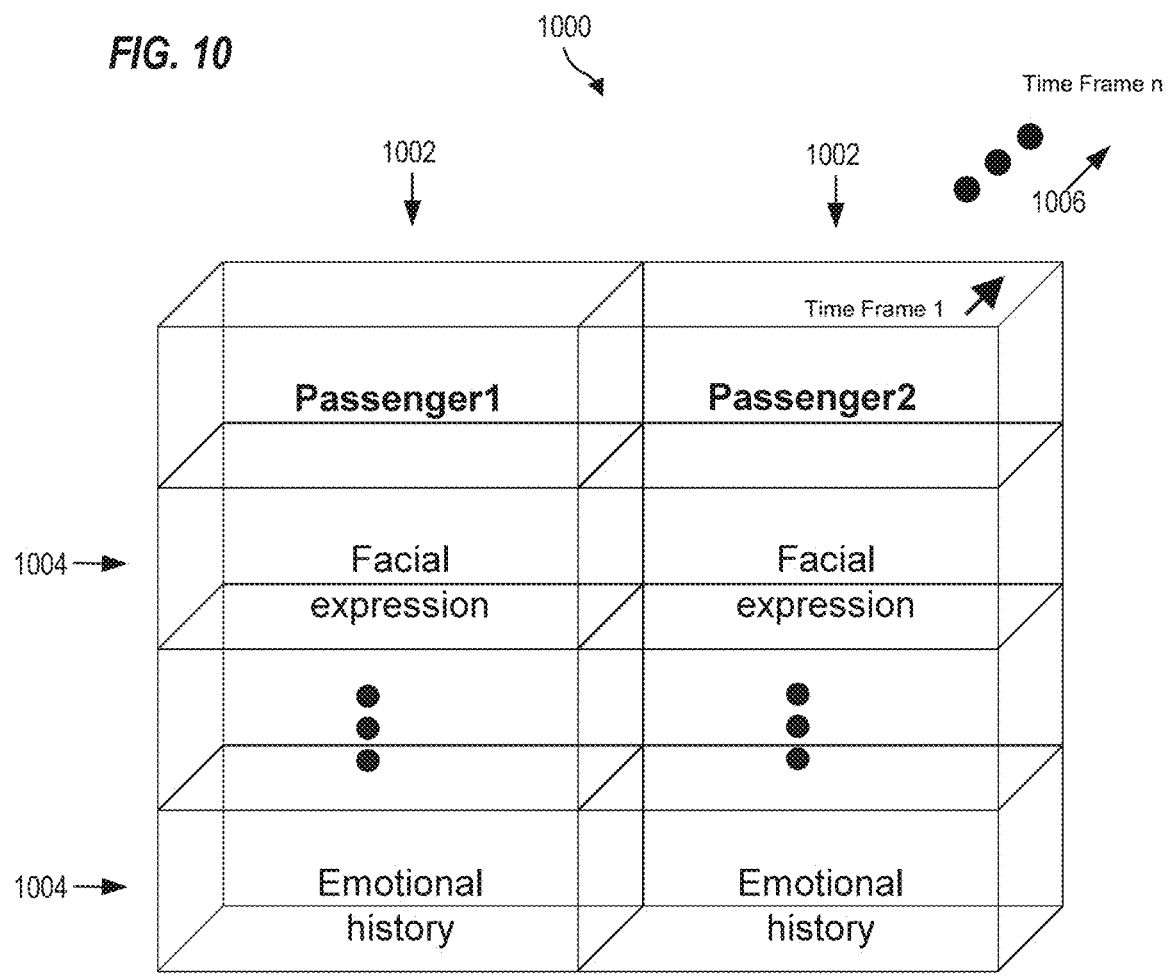
FIG. 10 is an illustration of a vehicle passenger behavior data tube according to embodiments of the present technology.

Once the VPB data has been gathered, the information is stored in data structure in step 904. As above, the data structure used to store VPB data may be a VPB data tube, or simply, VPB tube, an example of which is shown in FIG. 10. As in the VEI tube 600 described above, the VPB tube 1000 of FIG. 10 may include columns 1002 associated with the one or more passengers in a vehicle 102. Rows 1004 relates to a different parameter or characteristic gathered in step 902 described above. And, the depth 1006 of the VPB tube 1000 indicates frames at each time step at which data is gathered. Thus, a VPB tube 1000 may be a 3D volume data structure that stores information about each vehicle within the VEI radius over time.

The VPB tube 1000 allows the system to organize the attributes and characteristics of each passenger in each vehicle 102 within the VEI radius 104. Making it easier to organize the data allows the system to better understand what the individual passengers in vehicles 102 are doing. The VPB tube 1000 also allows the system to process information about the one or more passengers in each vehicle in parallel, as the VPB tube is inherently a concurrent data structure.

Once the gathered data is stored in a VPB tube data structure 1000, the on-board computer 112 can execute a classifier algorithm using the VPB tube data to determine a VPB score for each of the one or more passengers in a vehicle, and average overall VPB score for all passengers in the vehicle in step 908. In particular, the facial expression data, pose and gestural data, auditory cue data and historical data may all be used to discern an emotional state of the one or more passengers in a vehicle. For example, the shape and position of a person's mouth, eyes, eyelashes, brow, etc. may be mapped in a known way to different emotional states. Body pose (e.g., slouched, sitting up, sitting forward) may be mapped in a known way to different emotional states. Time-sequences of body motions may be compared to the body poses in predefined gestures stored in a gesture library to identify one or more known gestures performed by the one or more passengers. Such gestures (e.g., waving arms, shrugging shoulders, hand(s) over face), as well as the urgency with which these gestures are performed, may be mapped in a known way to different emotional states. Emotional state can also be discerned from a wide variety of auditory cues. Such auditory cues may for example include spoken words, singing, expressions and/or other utterances, as well as the pitch, tenor and/or volume of the utterances.

Using the physical and auditory data, together with its link to known emotional states, a classifier algorithm may be used to come up with a VPB score for each person in a vehicle, and an average overall VPB score for all passengers within a vehicle. In one embodiment, the classifier algorithm may be implemented in a neural network, including for example a convolutional neural network, a recurrent neural network or a combination of the two. Such a neural network can be trained using test data in a VPB tube, as well as live data from a VPB tube over time. In this way, the neural network can learn the patterns over time that equate to a specific VPB score (e.g., aggressive behavior and/or fearful behavior can label a passenger with a low VPB score or level).

It is understood that a classifier algorithm may use schemes other than, or in addition to, neural networks to calculate a VPB score. One such additional algorithm is a deep reinforcement learning algorithm. Deep reinforcement learning algorithms allow vehicles to use the VPB score (and other observations of the environment) to continuously learn from the emotional state(s) of its passenger(s) to possibly correct driving performance. By using reinforcement learning, the target vehicle can make observations about how the passengers are reacting to the actions taken by the target vehicle. And based on the actions taken, the target vehicle will receive a reward, which can be a feedback to the system as input. In this case, the reward is a high VPB score. The system's goal is to learn to improve its driving performance so that the VPB score can be maximized. The target vehicle can use, but is not limited to, neural networks as part of the policies that allow the vehicle to take specific actions in order to maximize its VPB score.

Figure 11:
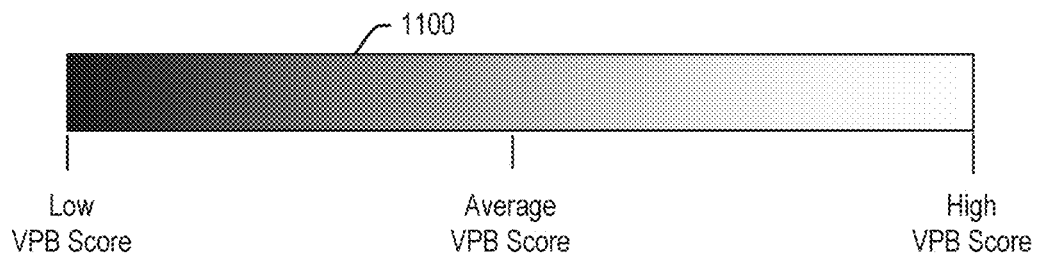
FIG. 11 illustrates a scale of vehicle passenger behavior scores from low to high according to embodiments of the present technology.

Passenger emotional states and VPB levels can be used in order to interpret how well a vehicle is following driving rules, and also how well a vehicle is interacting with its driving environment. In particular, when a vehicle is interacting well with its driving environment, it may be inferred that the one or more passengers are in a happy and/or relaxed state. When a vehicle is interacting poorly with its driving environment, it may be inferred that its one or more passengers are in an agitated, unhappy or surprised state. FIG. 11 demonstrates an example of a range of VPB scores 1100, varying from low to high. A low average VPB score determined for the one or more passengers in a vehicle may mean that the passenger(s) are experiencing unpleasant emotions, and by extension that the vehicle is driving poorly or in a high risk manner. Conversely, a high average VPB score determined for the one or more passengers in a vehicle may mean that the passenger(s) are experiencing pleasant emotions, and by extension that the target vehicle is driving well and interacting well with the driving environment.

In step 910, the average VPB score calculated by the on-board computer 112 for the one or more passengers in a vehicle may be communicated from the vehicle to other autonomous vehicles 102 in the VEI radius 104. The calculated VPB score may also be uploaded to the cloud service 120.

A vehicle can use the VPB score calculated for its passengers to reinforce its driving and interaction with the driving environment, and/or to improve its driving and interaction with the driving environment. In particular, as described above, each autonomous vehicle may drive and interact with its driving environment according to a predefined environmental interaction policy which may be trained and updated in real time by an algorithm such as for example implemented in a neural network as described above.

Figure 12:
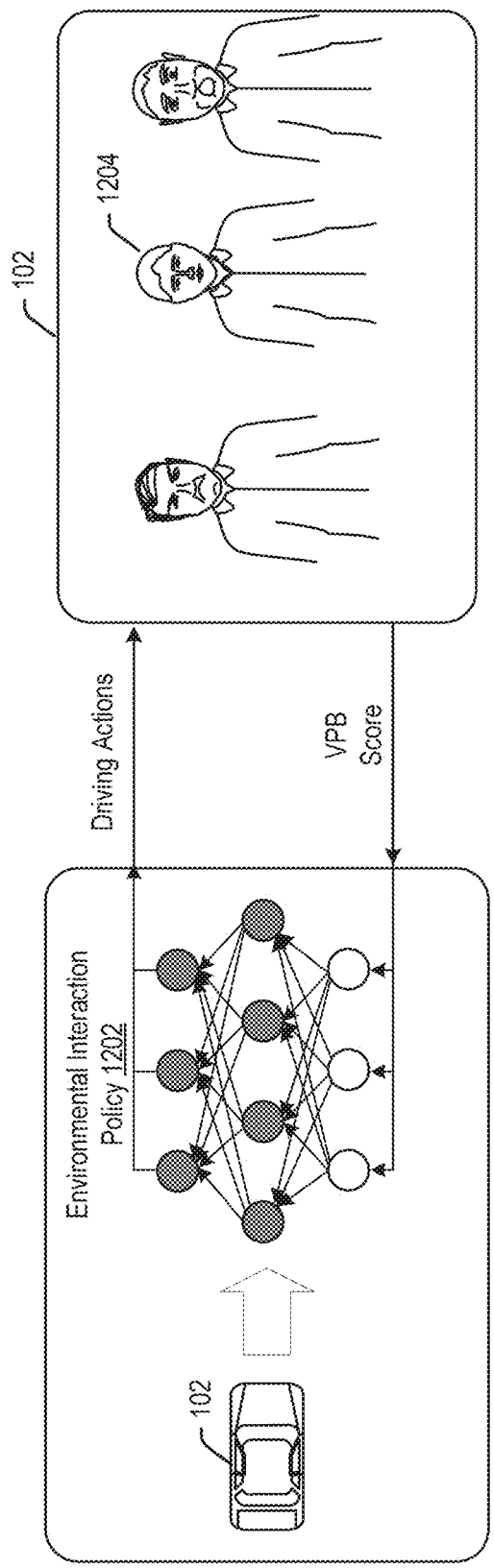
FIG. 12 is a schematic representation of a feedback loop in which vehicle passenger behavior scores for a vehicle may be fed back into an environmental interaction policy to reinforce and/or improve the driving of the vehicle according to embodiments of the present technology.

FIG. 12 illustrates schematically a neural network environmental interaction policy 1202 for a vehicle 102 learning in a closed loop feedback system from VPB scores received for the one or more passengers 1204 within the vehicle 102. The driving actions (among other possible properties) of vehicle 102 result in emotional responses from the passengers 1204, which are used to generate VEI scores for the passengers 1204. Those scores are received by the on-board computer 112 of vehicle 102, and fed back into the environmental interaction policy 1202 for vehicle 102 so that vehicle 102 can improve its driving actions and better interact with the driving environment.

The VPB level allows the system to find out what is the best driving behavior, within safety standards, that will allow the passengers to achieve an adequate emotional state (e.g., how to avoid making the passengers mad or have fear).

As described above, embodiments of the present technology can develop a vehicle-to-vehicle VEI score which can be used to characterize, reinforce and/or correct a vehicle's interaction with its driving environment. Embodiments of the present technology can also develop a vehicle-to-passenger VPB score which can also be used to characterize, reinforce and/or correct a vehicle's interaction with its driving environment. In embodiments, the present technology may be implemented using only the vehicle-to-vehicle VEI scores. In further embodiments, the present technology may be implemented using only the vehicle-to-passenger VPB scores.

In a further embodiment, the present technology may be implemented using both VEI and VPB scores. In such embodiments, the environmental interaction policy 802/1202 may receive both the VEI score and the VPB score as inputs to the neural network that is used to reinforce and/or correct driving actions and interactions with the driving environment. It is understood that the environmental interaction policy 802/1202 may receive other inputs in further embodiments. For example, in one such further embodiment, the VEI scores for all vehicles within the VEI radius may be used as inputs together with the VEI score for a given vehicle and the VPB score for the passengers in that vehicle.

Using vehicle-to-vehicle VEI scores and vehicle-to-passenger VPB scores to reinforce and/or correct a vehicles driving behavior and interaction with its environment provides a number of benefits. First, by quantizing and factoring in a vehicle's driving performance, and emotional responses to the vehicles' driving performance, the present technology improves the ability of the vehicle to maneuver around and interact with their driving environment. The present technology also results in safer driving, as the system exposes erratic behaviors of vehicles that can otherwise lead to an accident. A further benefit of the present technology is that it may use emotional responses from passengers within a given vehicle and passengers around a given vehicle (i.e., in surrounding vehicles) to reinforce and/or improve the given vehicle's interaction with its driving environment In embodiments described above, vehicles learn how to interact with their driving environment based on feedback of their driving actions and the emotional state(s) of the one or more passengers in the vehicle. In further embodiments, a first vehicle may pass on learned information to other vehicles so that these other vehicles may benefit from the learned driving experiences of the first vehicle. In embodiments, learned driving experiences are passed on from a first vehicle to one or more additional vehicles that are of the same or similar make, brand, year and/or similar characteristics as the first vehicle, though that need not be so in further embodiments.

Thus, as one of many examples, a first vehicle may gain information used to improve its driving in a heavy traffic area, such as in a large city using the VEI and/or VPB scores as described above. This information may then be uploaded to the cloud service 120 and stored, so that other vehicles, perhaps those which are the same make, model and/or year as the first vehicle, can access this information when driving in the same or similar traffic areas. This information may alternatively or additionally be passed using the peer-to-peer network describe above. This information may be used to improve the adaptation speed of these other vehicles when driving in an environment where the vehicles have never been to before.

Figure 13:
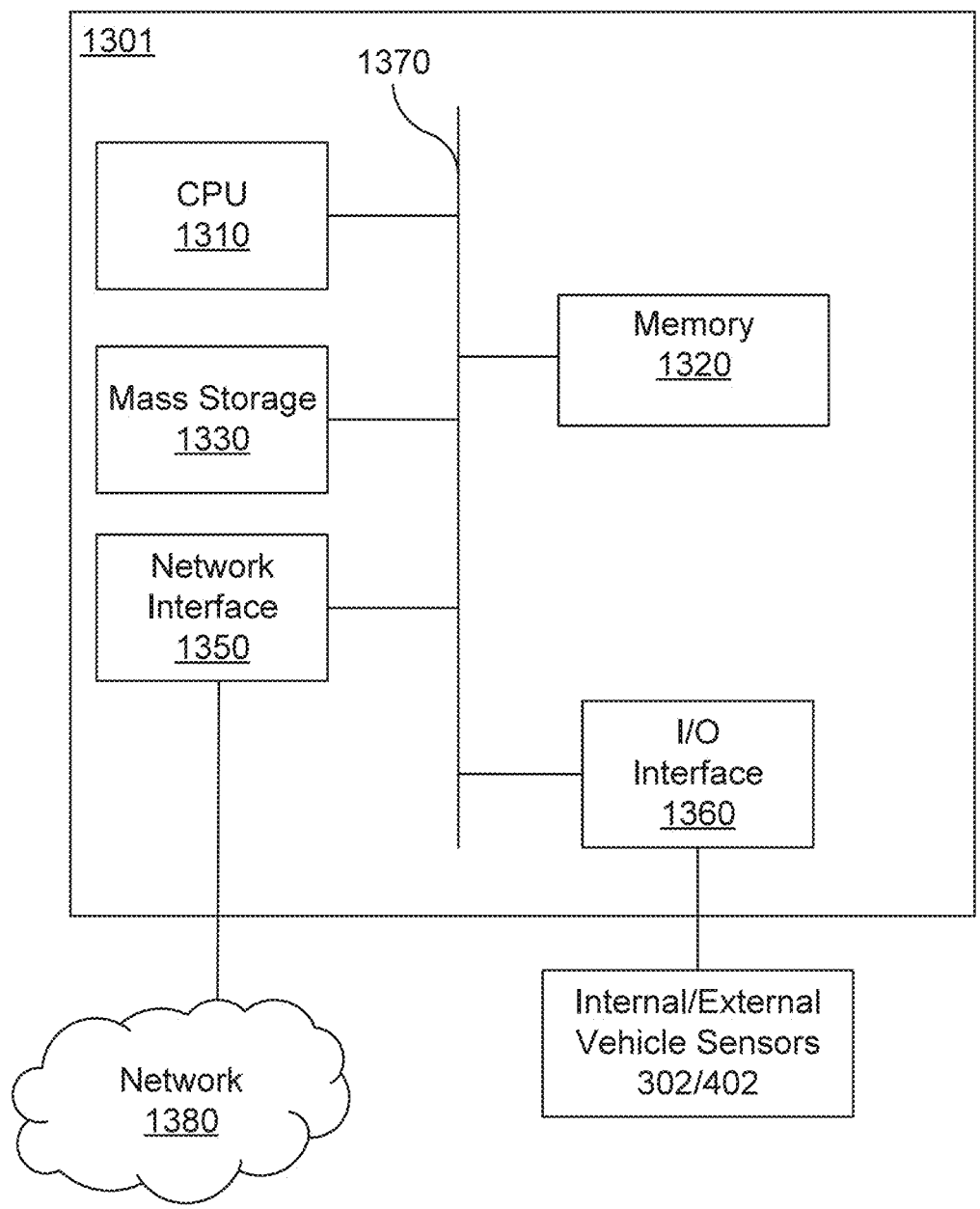
FIG. 13 is a block diagram of a network processing device that can be used to implement various embodiments of an on-board computer in accordance with the present technology.

FIG. 13 is a block diagram of a network processing device 1301 that can be used to implement various embodiments of an on-board computer 112 in accordance with the present technology. Specific network processing devices may utilize all of the components shown, or only a subset of the components, and levels of integration may vary from device to device. Furthermore, the network processing device 1301 may contain multiple instances of a component, such as multiple processing units, processors, memories, transmitters, receivers, etc. The network processing device 1301 may be equipped with one or more input/output devices, such as network interfaces, storage interfaces, and the like. The processing unit 1301 may include a central processing unit (CPU) 1310, a memory 1320, a mass storage device 1330, and an I/O interface 1360 connected to a bus 1370. The bus 1370 may be one or more of any type of several bus architectures including a memory bus or memory controller, a peripheral bus or the like.

The CPU 1310 may comprise any type of electronic data processor. The memory 1320 may comprise any type of system memory such as static random access memory (SRAM), dynamic random access memory (DRAM), synchronous DRAM (SDRAM), read-only memory (ROM), a combination thereof, or the like. In an embodiment, the memory 1320 may include ROM for use at boot-up, and DRAM for program and data storage for use while executing programs. In embodiments, the memory 1320 is non-transitory. The mass storage device 1330 may comprise any type of storage device configured to store data, programs, and other information and to make the data, programs, and other information accessible via the bus 1370. The mass storage device 1330 may comprise, for example, one or more of a solid state drive, hard disk drive, a magnetic disk drive, an optical disk drive, or the like.

The processing unit 1301 also includes one or more network interfaces 1350, which may comprise wired links, such as an Ethernet cable or the like, and/or wireless links to access nodes or one or more networks 1380. The network interface 1350 allows the processing unit 1301 to communicate with remote units via the networks 1380. For example, the network interface 1350 may provide wireless communication via one or more transmitters/transmit antennas and one or more receivers/receive antennas. In an embodiment, the processing unit 1301 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for improving interaction of a plurality of autonomous vehicles within a driving environment including the autonomous vehicles, the system comprising:
   a first autonomous vehicle of the plurality of autonomous vehicles; and
   one or more sensors on the first autonomous vehicle, the one or more sensors configured to record environment interaction metrics of a second autonomous vehicle relating to how the second autonomous vehicle interacts with the driving environment, the first autonomous vehicle configured to transmit an indicator of the environment interaction metrics to the second autonomous vehicle for use by the second autonomous vehicle in one or more of reinforcing and correcting how the second autonomous vehicle drives.

2. The system of claim 1, wherein the environment interaction metrics are based on one or more of how courteously and safely the second autonomous vehicle is interacting with the driving environment.

3. The system of claim 1, wherein the environment interaction metrics comprise one or more of:
   identification of the second autonomous vehicle, including for example a year, make and model of the second autonomous vehicle and registration information for the second autonomous vehicle;
   current driving speed of the second autonomous vehicle;
   location of the second autonomous vehicle;
   actions of the second autonomous vehicle, including how often the second autonomous vehicle changes lanes;
   number of passengers of the second autonomous vehicle; and
   a type of sensors used in the second autonomous vehicle.

4. The system of claim 1, wherein the environment interaction metrics are stored in a data tube and processed by an algorithm to obtain the indicator.

5. The system of claim 1, wherein the indicator comprises a first indicator, the first autonomous vehicle further generating a second indicator based on behavioral characteristics of one or more passengers in the first autonomous vehicle, the first autonomous vehicle using the second indicator to one or more of reinforce and correct how the first autonomous vehicle drives.

6. The system of claim 5, wherein the behavioral characteristics are captured by a second set of sensors in an interior of the first autonomous vehicle.

7. The system of claim 6, wherein the second set of sensors capture at least one of facial expression, body pose and utterances of the one or more passengers in the first autonomous vehicle.

8. The system of claim 1, wherein the first and second autonomous vehicles are within a predefined distance of each other.

9. The system of claim 8, wherein the predefined distance is varied by the first autonomous vehicle based on the driving environment.

10. A system for improving interaction of a plurality of autonomous vehicles within a driving environment including the autonomous vehicles, the system comprising:
    a first autonomous vehicle of the plurality of autonomous vehicles, the first autonomous vehicle comprising:
       a first group of one or more sensors configured to capture a first set of data relating to characteristics of a second autonomous vehicle driving within the driving environment;
       a second group of one or more sensors configured to capture a second set of data relating to behaviors of one or more passengers within the first autonomous vehicle; and
       a computer executing at least one of a first algorithm and a second algorithm, the first algorithm instructing the computer to:
          determine a vehicle environment interaction (VEI) radius around the first autonomous vehicle, the second autonomous vehicle being within the VEI radius of the first autonomous vehicle;
          receive the first set of data captured from the first group of one or more sensors,
          calculate a VEI score based on the first set of data captured, the VEI score relating to a manner in which the second autonomous vehicle is driving, and communicate the VEI score from the first autonomous vehicle to the second autonomous vehicle for the second autonomous vehicle to one or more of reinforce and correct the manner in which the second autonomous vehicle drives; and the second algorithm instructing the computer to:
receive the second set of data captured from the second group of one or more sensors,
calculate a vehicle passenger behavior (VPB) score based on the second set of data captured, the VPB score relating to perceived emotions of the one or more passengers in the first autonomous vehicle, and
use the VPB score calculated to one or more of reinforce and correct the manner in which the first autonomous vehicle drives.

11. The system of claim 10, wherein a size of the VEI radius varies based on the driving environment.

12. The system of claim 10, wherein the VEI score relates to one or more of how courteously and safely the second autonomous vehicle is interacting with the driving environment, as measured by the first autonomous vehicle.

13. The system of claim 10, wherein the VPB score relates to one or more of how courteously and safely the first autonomous vehicle is interacting with the driving environment, as measured by the perceived emotions of the one or more passengers.

14. The system of claim 10, further comprising a cloud service for storing information relating to the second autonomous vehicle, the computer further receiving the information from the cloud service for use in determining the VEI score.

15. The system of claim 10, further comprising a third autonomous vehicle receiving information from the second autonomous vehicle, the information based on at least one of the VEI score and the VPB score, and the information used by the third autonomous vehicle to one or more of reinforce and correct the manner in which the third autonomous vehicle drives.

16. A method of improving interaction of a plurality of autonomous vehicles within a driving environment including the autonomous vehicles, the method comprising:
measuring, by each vehicle of a group of one or more subject vehicles of the plurality of autonomous vehicles, a set of attributes relating to a manner in which a target vehicle of the plurality of autonomous vehicles is driving;
storing the set of attributes measured in a vehicle environment interaction (VEI) tube;
calculating a VEI score for each set of attributes measured by each vehicle of the group of one or more subject vehicles using a neural network which takes data from the VEI tube as inputs, the one or more VEI scores representing how well the target vehicle is interacting with the group of one or more subject vehicles and the driving environment; and
communicating the one or more VEI scores to the target vehicle for the target vehicle to one or more of affirm and adjust driving actions of the target vehicle based on the one or more VEI scores.

17. A method of improving interaction of a plurality of autonomous vehicles within a driving environment including the autonomous vehicles, the method comprising:
measuring a set of attributes indicative of an emotional state of one or more passengers in an autonomous vehicle of the plurality of autonomous vehicles;
storing the set of attributes measured in a vehicle passenger behavior (VPB) tube;
calculating a VPB score for the set of attributes measured using a neural network which takes data from the VPB tube as inputs, the VPB scores representing a measure of an emotional state of at least one of the one or more passengers; and
adjusting driving actions of the autonomous vehicle based on the VPB scores.

* * * * *